W. G. CLARK.
ADJUSTABLE AIR SEPARATOR.
APPLICATION FILED NOV. 16, 1920.

1,383,984.

Patented July 5, 1921.
2 SHEETS—SHEET 1.

Inventor:
William G. Clark
By Gillson & Gillson
Attys.

UNITED STATES PATENT OFFICE.

WILLIAM G. CLARK, OF CHICAGO, ILLINOIS.

ADJUSTABLE AIR-SEPARATOR.

1,383,984.   Specification of Letters Patent.   Patented July 5, 1921.

Application filed November 16, 1920. Serial No. 424,373.

*To all whom it may concern:*

Be it known that I, WILLIAM G. CLARK, a citizen of the United States, and resident of Chicago, county of Cook, and State of Illinois, have invented certain new and useful Improvements in Adjustable Air-Separators, of which the following is a specification, and which are illustrated in the accompanying drawings, forming a part thereof.

The invention relates to dust separators and has as an object a device of this nature that will separate the coarse dust particles from the fine, allowing the fine to be carried through the device by air currents. A further object is the provision of a device of this nature which may be so adjusted as to remove any desired percentage of the coarser particles, or, in other words, to remove all particles larger than any given desired size which can be carried into the device by the air currents. A further object of the invention is the provision of a device of this nature which may be adjusted while in full operation.

An illustrative embodiment of the invention is shown in the accompanying drawings in which:—

Figure 1:
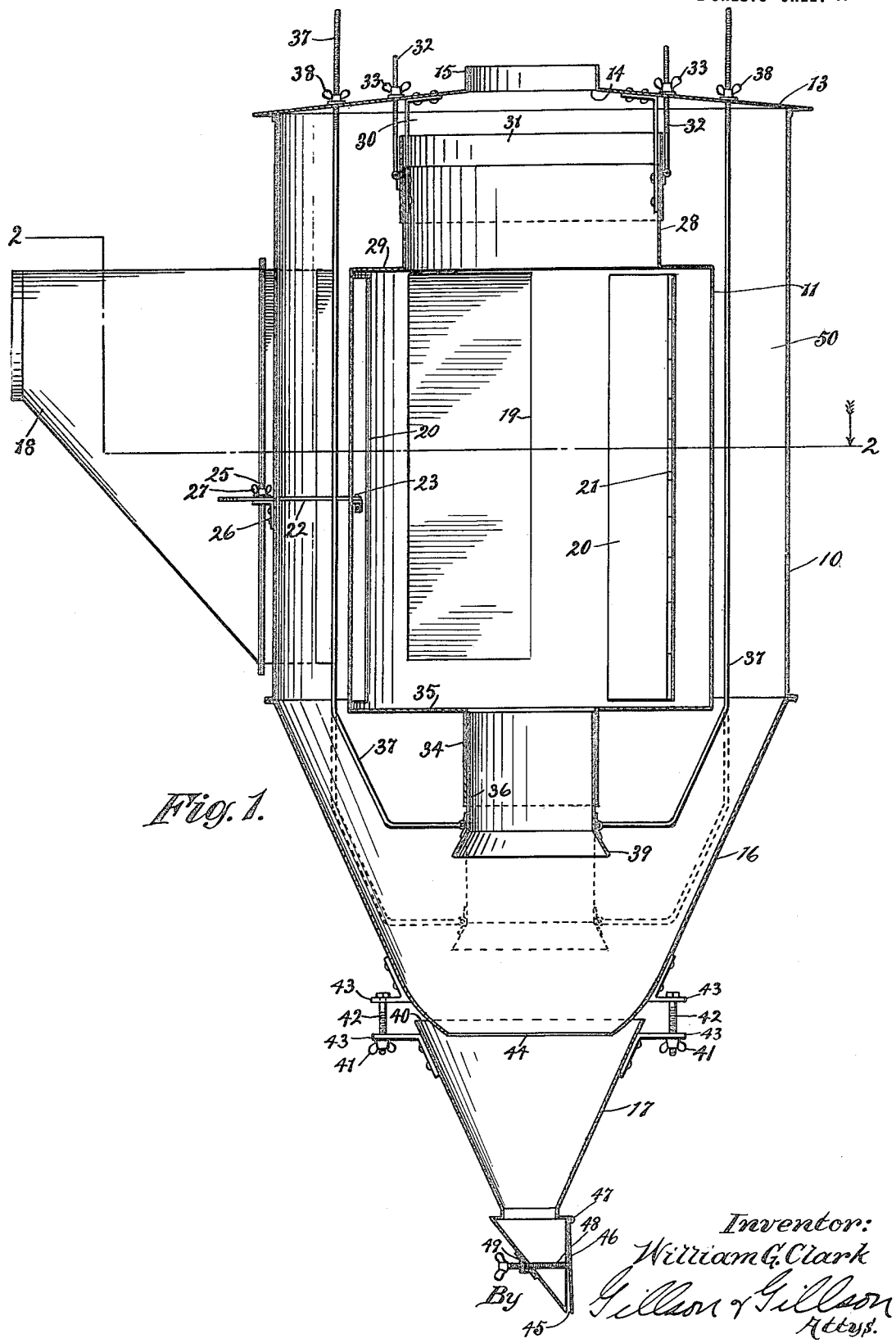
Figure 1 is a vertical section on line 1—1 of Fig. 3.
Figure 2:
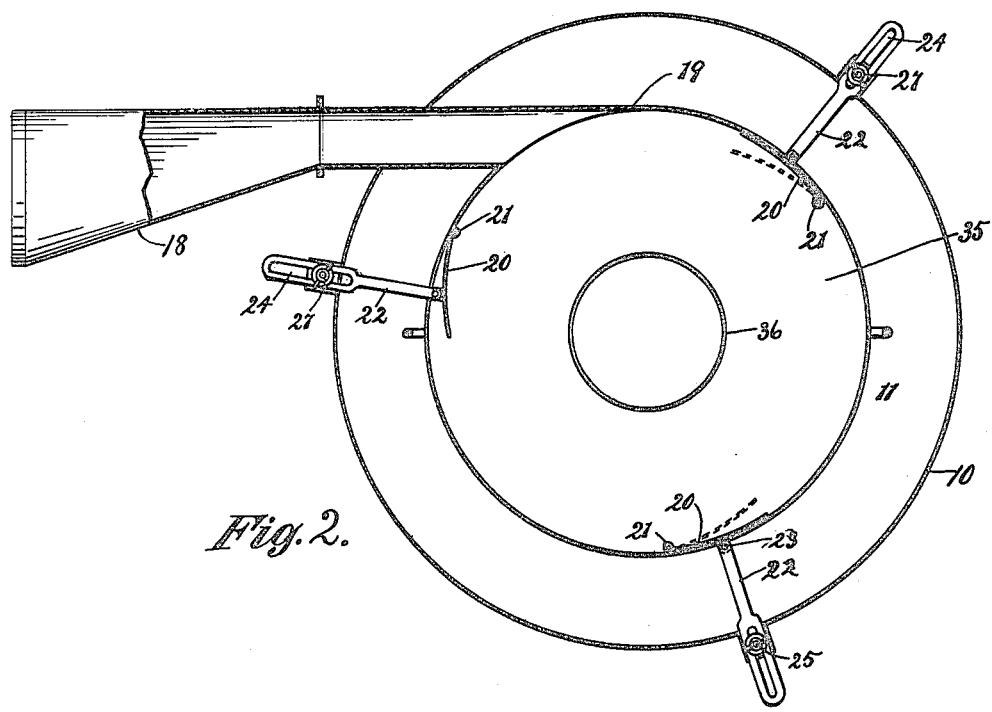
Fig. 2 is a horizontal section on line 2—2 of Fig. 1.
Figure 3:
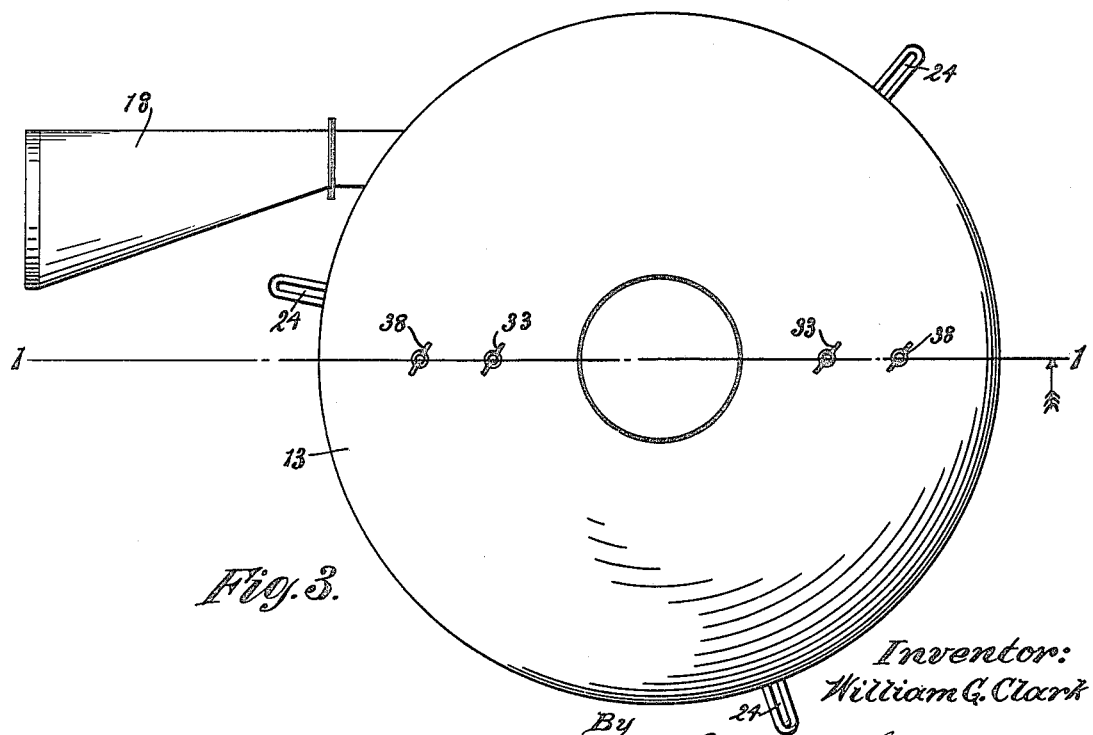
Fig. 3 is a plan view.

The device comprises an outer drum 10 and an inner drum 11. The outer drum is closed at the top by a plate 13 preferably of a flat conical form and provided with an outlet opening 14 surrounded by a collar 15 for connection with a pipe to lead away the outgoing air and fine dust. The drum 10 is closed at its bottom by a cone comprising two sections 16 and 17.

To lead air, carrying the dust to be separated, into the device, an inlet pipe 18 leads through the outer drum 10 and into the inner drum 11 at a tangent thereto, as at 19. The dust particles being heavier than the air will tend to hug the walls of the inner drum, due to centrifugal force resultant from the swirling motion caused by the tangential relation of inlet 18 to the periphery of the drum. Moreover, the centrifugal action will cause the heavier dust particles to hug most closely to the wall of the inner drum. To catch any desired proportion of the particles, adjustable flaps 20, are hinged to the drum, as at 21, and may be swung inwardly and held in any desired adjustment by rods 22 pivotally secured to the flaps, as at 23. The rods 22 are preferably flattened at their outer ends and extend through slots in the outer drum 10. The flattened end may be slotted, as at 24, and when so formed may be clamped in adjusted position by a bolt 25 passing through the slot and through a bracket 26 affixed to the outer side of the drum 10. A wing nut 27 may be used for convenient change of the adjustment of the flaps.

A short pipe 28 extending toward the outlet, but terminating short of the top 13, is connected to the periphery of the drum 11, by means of a flat annular ring 29. To provide an adjustment of the gap 30 between the top of the pipe 28 and the top 13, a ring 31, telescoping with the pipe 28 may be hung on threaded rods 32 which may be adjusted to vary the width of the gap 30 by means of wing nuts 33 on the exterior of the top 13.

A short pipe 34 is connected with the bottom of the periphery of the drum 11 by means of a flat annular ring 35. To, in effect, vary the downward extension of pipe 34, a section 36 of pipe is provided which telescopes with pipe 34 and which may be supported by rods 37 passing through the top 13. Wing nuts 38 are provided on the exterior of the top for use in adjusting the position of the pipe 36. The lower end of pipe 36 is preferably provided with a flaring mouth, as at 39.

The coarse particles will be separated from the fine to a great extent by the flaps 20. Some of the fine particles, however, will be carried with the coarse into the outer chamber and will slide down the surface of the cone 16 with those particles. To separate these particles it is necessary to admit air to the lower portion of the cone. One means for such admission is shown in the form of an adjustable gap 40 between the two sections 16, 17, of the cone. The gap 40 may be adjusted by means of the wing nuts 41, and bolts 42, acting on the brackets 43 secured to the sections 16, 17. The material may be separated from the surface of the cone in the form of a cascade and the air from the gap 40 may be drawn directly through it while falling, if the lower edge of the section 16 be inwardly curved, as shown at 44.

The coarser or heavier particles which are removed by the device are allowed to flow continuously from a discharge opening at 45 governed by a door 46 hinged at 47. The size or weight of the particles that can be carried upward through outlet opening 14 by the air will be determined by the speed of the air current which in turn will be determined by the freedom of entrance of air into the device. To adjust the admission of air after the gap 40 has been adjusted as desired, the gate 46 may be held open against the suction of the fan drawing air out of the device, by means of a threaded rod 48 passing through a fixed interiorly threaded boss 49.

The device, as described, has five separate adjustments by proper manipulation of which the desired percentage of the coarser particles may be removed from the air and the finer particles may be carried on to be removed, if desired, by other apparatus.

The adjustment of the flaps 20 will determine what proportion of the air and dust will be allowed to escape to the outer chamber from the lighter. Also the adjustment of the individual flaps may vary so as to act differently at their differing peripheral separations from the inlet pipe.

The adjustment of the gap 30 will determine the speed of upward flow in the chamber 50 and hence will determine the proportion of heavier particles that will be carried upward.

The adjustment of the pipe 36 will aid the adjustment of the gap 30 since lowering the mouth 39 will bring it nearer the sides of the cone section 16 and will vary the relative area of cross section of cone leading to chamber 50 and into pipes 34, 36, which presents two avenues of escape for air admitted through gap 40 and discharge 45.

The adjustment of gap 40 determines the speed of air through the cascaded material and hence the final separation of the fine and coarse or light and heavy particles.

The adjustment of the gate 46, after the other adjustments, will finally determine the speed of the air out of outlet 14 and hence the size or weight of particles that can be carried away by the escaping air. The device may be utilized to separate particles of different nature having different specific gravities as well as particles of the same nature having different sizes, therefore in the foregoing description or in the claims, wherever the terms "coarse and fine" are used, the words "heavy and light" are to be understood as being their equivalents.

Minor changes may be made in the physical embodiment of the invention without departing from its spirit.

I claim as my invention:

1. An air separator comprising, in combination, an outer drum having an outlet in substantially the center of its upper end, an inner drum, means for introducing dust laden air tangentially into said inner drum, an inwardly deflected member in the periphery of the inner drum providing a gap communicating with the space between the drums facing the currents of air from said inlet, an outlet pipe projecting from the upper end of said inner drum terminating short of the end of the outer drum adjacent its outlet whereby a gap is provided placing the space between the drums in communication with said outlet.

2. An air separator comprising, in combination, an outer drum having an outlet in substantially the center of its upper end, an inner drum, means for introducing dust laden air tangentially into said inner drum, an inwardly deflected member in the periphery of the inner drum providing a gap facing the currents of air from said inlet, an outlet pipe projecting from the upper end of said inner drum terminating short of the end of the outer drum adjacent its outlet whereby a gap is provided placing the space between the drums in communication with said outlet, and means to adjust the width of said last named gap.

3. An air separator comprising, in combination, an outer drum having an outlet in its top, an inner drum having an opening in both top and bottom and a dust intercepting gap in its periphery, means for introducing dust laden air tangentially into said inner drum, a conical extension downward of the walls of said outer drum having means to introduce air into its lower portion, a pipe projecting downward from the lower opening of said inner drum and means telescoping with said pipe adapted to be adjusted to vary the area of the space admitting air from said lower portion of the cone to the space between said drums.

4. An air separator comprising, in combination, an outer drum, an inner drum having a dust intercepting gap in its periphery, means to introduce dust laden air tangentially into said inner drum, a conical downward extension of the walls of the outer drum having horizontal sections providing an air gap therebetween and an outlet for said drums.

5. An air separator comprising, in combination, an outer drum, an inner drum having a dust intercepting gap in its periphery, means to introduce dust laden air tangentially into said inner drum, a conical downward extension of the walls of the outer drum having horizontal sections providing an air gap therebetween, means to adjust said gap, and an outlet for said drums.

6. An air separator comprising, in combination, an outer drum, an inner drum having a dust intercepting gap in its periphery, means to introduce dust laden air tangentially into said inner drum, a conical downward extension of the walls of the outer drum having overlapping horizontal sections providing an air gap therebetween, the lower section overlapping the upper, the lower margin of the upper section inwardly curved so as to cascade material sliding down the surface of the cone.

7. An air separator comprising, in combination, an outer drum, an inner drum having a dust intercepting gap in its periphery, means to introduce dust laden air tangentially into said inner drum, a conical downward extension of the walls of the outer drum having overlapping horizontal sections providing an air gap therebetween, the lower section overlapping the upper, the lower margin of the upper section inwardly curved so as to cascade material sliding down the surface of the cone and means to adjust said air gap.

8. An air separator comprising, in combination, an outer drum having an outlet at its top, a conical downward extension of the walls of the outer drum, said extension having means for admitting air into its lower portion, an inner drum inclosed within and spaced from said outer drum and having a dust intercepting gap in its periphery, means to introduce dust laden air tangentially into said inner drum, an outlet pipe extending from the upper end of said inner drum to convey air to said outlet, the space between said drums having communication at its top with said outlet, a pipe extending downward from said inner drum into said conical extension, means telescoping with said last named pipe to adjust the relative portions of the cross sectional area of said conical extension which give access to said inner drum and to the space between the drums respectively.

WILLIAM G. CLARK.